United States Patent
Swanson (10) Patent No.: US 12,391,170 B1
(45) Date of Patent: Aug. 19, 2025

(54) TRAILER WIRELESS REVERSE LIGHT

(71) Applicant: Neil James Swanson, Prescott, MI (US)

(72) Inventor: Neil James Swanson, Prescott, MI (US)

(*) Notice: Subject to any disclaimer, the term of this patent is extended or adjusted under 35 U.S.C. 154(b) by 0 days.

(21) Appl. No.: 19/007,759

(22) Filed: Jan. 2, 2025

Related U.S. Application Data (60) Provisional application No. 63/729,421, filed on Dec. 8, 2024.

(51) Int. Cl.
| | | |
|---|---|---|
| *B60Q 1/22* | (2006.01) | |
| *B60Q 1/00* | (2006.01) | |
| *B60R 16/033* | (2006.01) | |
| *F21S 9/02* | (2006.01) | |
| *F21S 43/14* | (2018.01) | |

(52) U.S. Cl.
CPC ............. *B60Q 1/22* (2013.01); *B60Q 1/0094* (2013.01); *B60R 16/033* (2013.01); *F21S 9/02* (2013.01); *F21S 43/14* (2018.01)

(58) Field of Classification Search
CPC ........ B60Q 1/305; B60Q 1/22; B60Q 1/0094; F21S 43/14; F21S 9/02; B60R 16/033
See application file for complete search history.

(56) References Cited

U.S. PATENT DOCUMENTS

| | | | | |
|---|---|---|---|---|
| 6,100,801 A | * | 8/2000 | Plummer | B60Q 1/305 362/540 |
| 8,322,899 B1 | * | 12/2012 | Rosario | B60Q 7/02 362/540 |
| 9,545,878 B2 | * | 1/2017 | Simmons | G09F 27/00 |
| 11,964,609 B2 | | 4/2024 | Stillwell | |
| 2013/0241722 A1 | | 9/2013 | Martinez | |
| 2014/0145837 A1 | | 5/2014 | Douglas | |
| 2019/0315170 A1 | | 10/2019 | Williams | |

FOREIGN PATENT DOCUMENTS

| | | |
|---|---|---|
| CN | 218536515 | 2/2023 |
| WO | 2020048574 | 3/2020 |

OTHER PUBLICATIONS

Hendo, "Wireless Heavy Duty Trailer Lights Kit—5000mAh Battery, Battery Life Display, Magnetic Lights, 7 pin Round and 7 pin Flat adapters, 24hr Life, T1, Hendo", Sep. 30, 2024 as established by review dates, https://www.amazon.com/Wireless-Trailer-Lights-Kit-Built/dp/BOCNPLG7VV?ref_=ast_sto_dp (Year: 2024).*

* cited by examiner

*Primary Examiner* — Matthew J. Peerce (57) ABSTRACT

An aftermarket trailer wireless reverse light kit is disclosed that provides trailers with a backup light that is activated when the tow vehicle is put in reverse. Also, the reverse light bar can be removed and manually switched on/off for use as auxiliary lighting separate from the trailer. It is easy to install with minimal effort and requires no special tools. This device consists of two main parts—a 7-pin extension cable between the tow vehicle and the trailer with an integrated wireless transmitter and a weather-proof, battery-powered, rechargeable LED reverse light bar with an integrated wireless receiver (matched to the transmitter) that is lock and key mounted to the trailer rear using a permanently affixed mounting base. As necessary, the reverse light bar can be removed from the mounting base to be recharged with a typical USB cable or be used as an auxiliary light.

1 Claim, 15 Drawing Sheets

TRAILER WIRELESS REVERSE LIGHT

BACKGROUND

Most trailers do not have reverse/back-up lights as they are not required by regulation. However, many operators would appreciate having reverse lights on their trailer to advise drivers or pedestrians behind that reverse motion is eminent and also to allow the operator to better see behind the trailer at night while backing up enhancing safety by improving visibility. An aftermarket trailer wireless reverse light kit should be easily installed after the trailer is produced with minimal labor and no special tools or skill.

SUMMARY

An aftermarket Trailer Wireless Reverse Light Kit is introduced providing trailers with a backup light that can be remotely controlled while backing up when the tow vehicle is put in reverse. It is easy to install with minimal effort and requires no special tools, designed to enhance safety and improve visibility while reversing trailers at night. This kit consists of two main parts. First, a 7-pin extension that has an integrated wireless transmitter powered by the reverse lead already available in the trailer 7-pin wire harness. This extension is plugged into the existing vehicle 7-pin receptacle. The existing trailer 7-pin plug is then inserted into the extension receptacle. A trailer 4-pin plug can also be connected to the extension receptacle with a commercially available adapter. Second, a weather-proof, battery-powered, rechargeable LED reverse light bar with an integrated wireless receiver (matched to the transmitter) is lock and key mounted to the trailer rear using a permanently affixed mounting base. So, when the operator puts the vehicle/trailer into reverse, the reverse light will be activated via a wireless signal. As necessary, the reverse light bar can be removed and recharged with a typical USB cable. Also, the reverse light bar can be removed from the mounting base and manually switched on/off and used as auxiliary lighting separate from the trailer if needed. This design ensures easy installation and operation, making it a practical solution for improved trailer safety and visibility.

DETAILED DESCRIPTION

Figure 1:
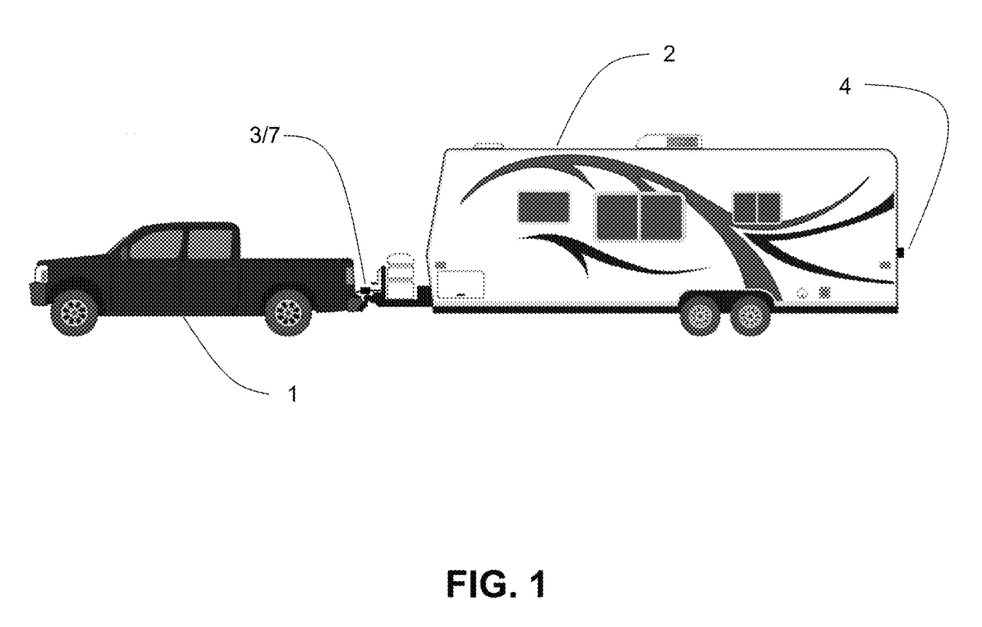
FIG. 1: Trailer Wireless Reverse Light Setup
Figure 2:
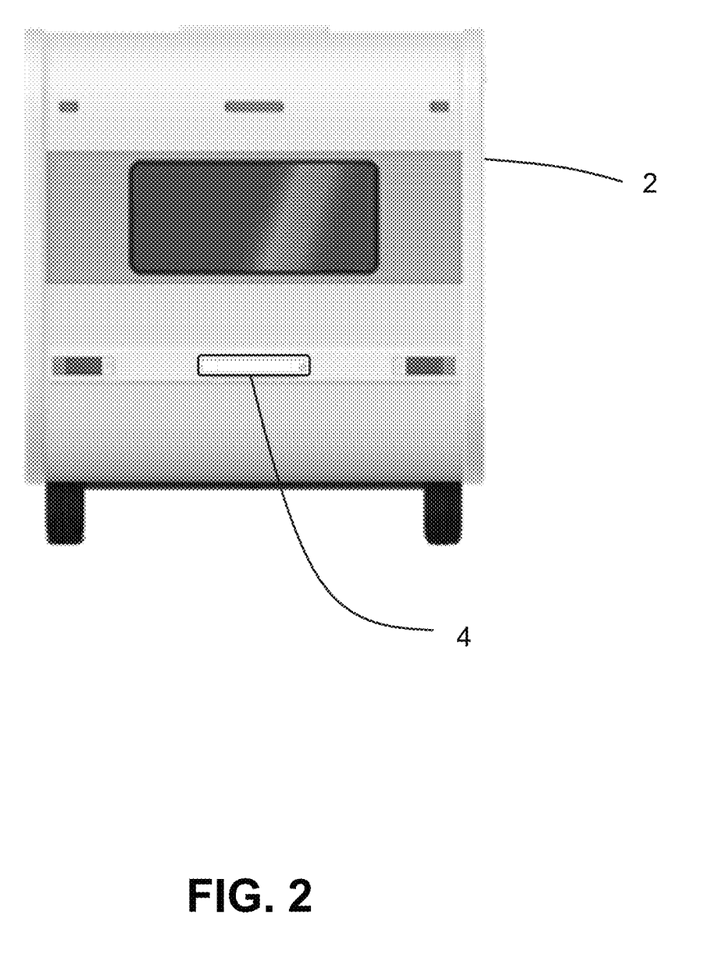
FIG. 2: Trailer Wireless Reverse Light Mounting Location

FIG. 1 is a view of a typical tow vehicle 1 pulling a trailer 2 showing the location of the two key components of a trailer wireless reverse light kit. The first component is a 7-pin extension 3 located between the tow vehicle 1 and the trailer 2. This extension has an integrated wireless transmitter 7. The second component is the trailer wireless reverse light 4 (matched to the transmitter) mounted to the rear of the trailer. FIG. 2 shows the trailer wireless reverse light 4 typical mounting location in the rear center of the trailer 2. Alternatively, there could be two trailer wireless reverse lights 4 mounted to the rear of the trailer 2 located near the existing rear lights.

Figure 3:
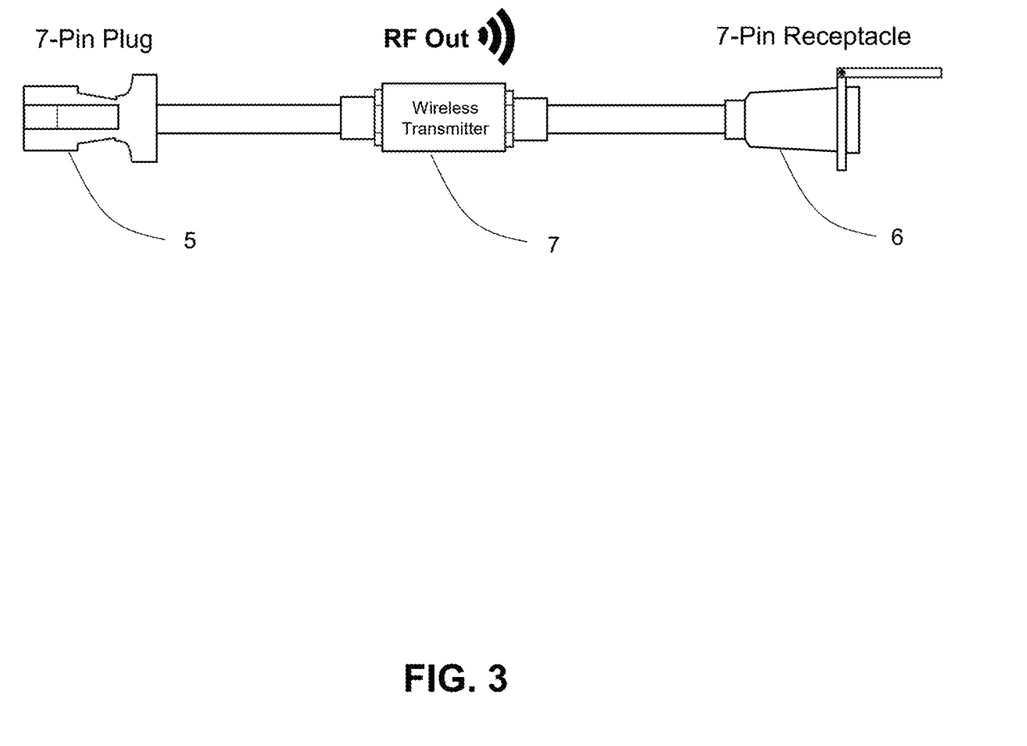
FIG. 3: Trailer Wireless Reverse Light 7-Pin Extension with Reverse Wireless Transmitter
Figure 4:
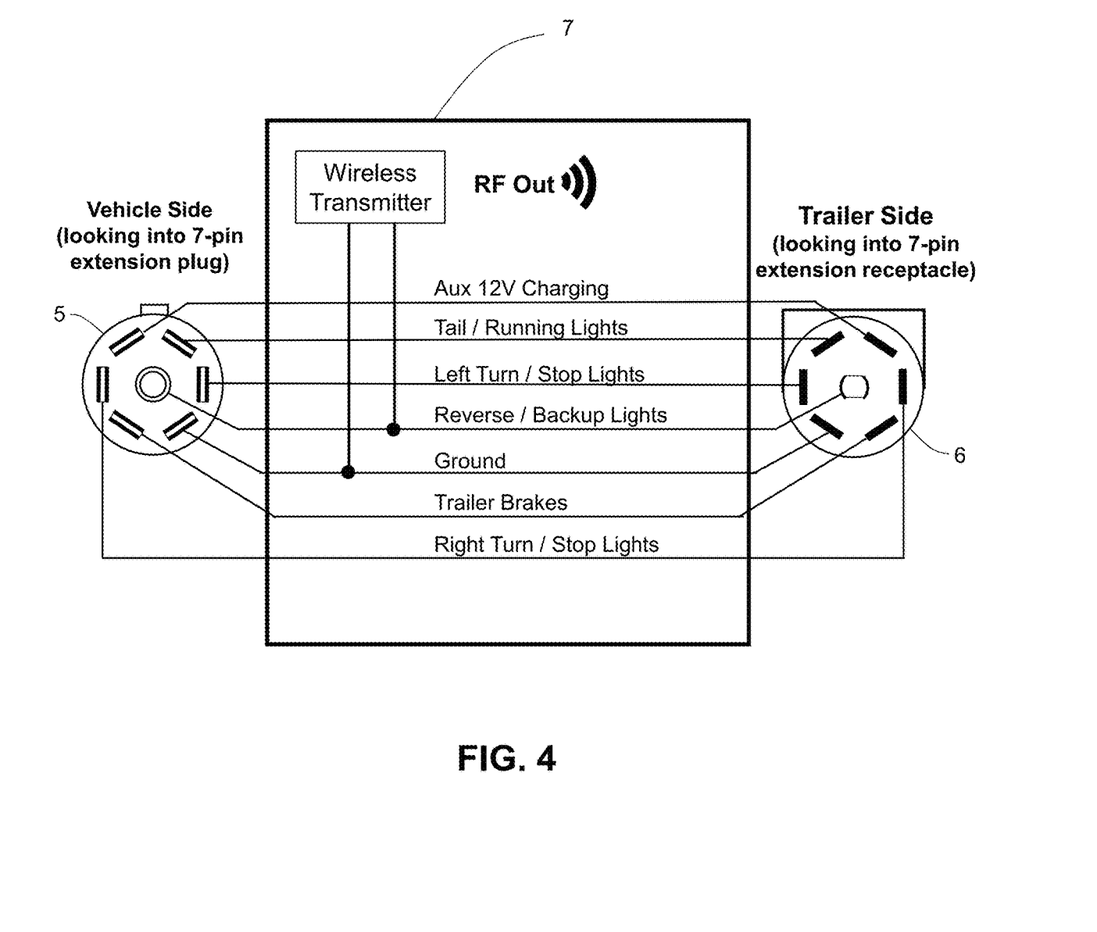
FIG. 4: Trailer Wireless Reverse Light 7-Pin Extension with Reverse Wireless Transmitter-High-Level Circuit Diagram

FIG. 3 shows the 7-pin extension parts. One end has a 7-pin plug 5 that is inserted into the existing tow vehicle 7-pin receptacle. The other end has a 7-pin receptacle 6 that receives the existing 7-pin plug of the trailer. Located between the 7-pin plug 5 and the 7-pin receptacle 6 is the wireless transmitter 7. FIG. 4 shows the high-level circuit diagram of the 7-pin extension. The 7-pin plug 5, 7-pin receptacle 6 and the seven wires that connect them. The wireless transmitter 7 is connected to the reverse/backup lights wire and the ground wire. When the operator puts the tow vehicle 1/trailer 2 into reverse, the wireless transmitter 7 emits a radio signal. The wireless transmitter's design is not novel. Many different designs and frequencies are available.

Figure 5:
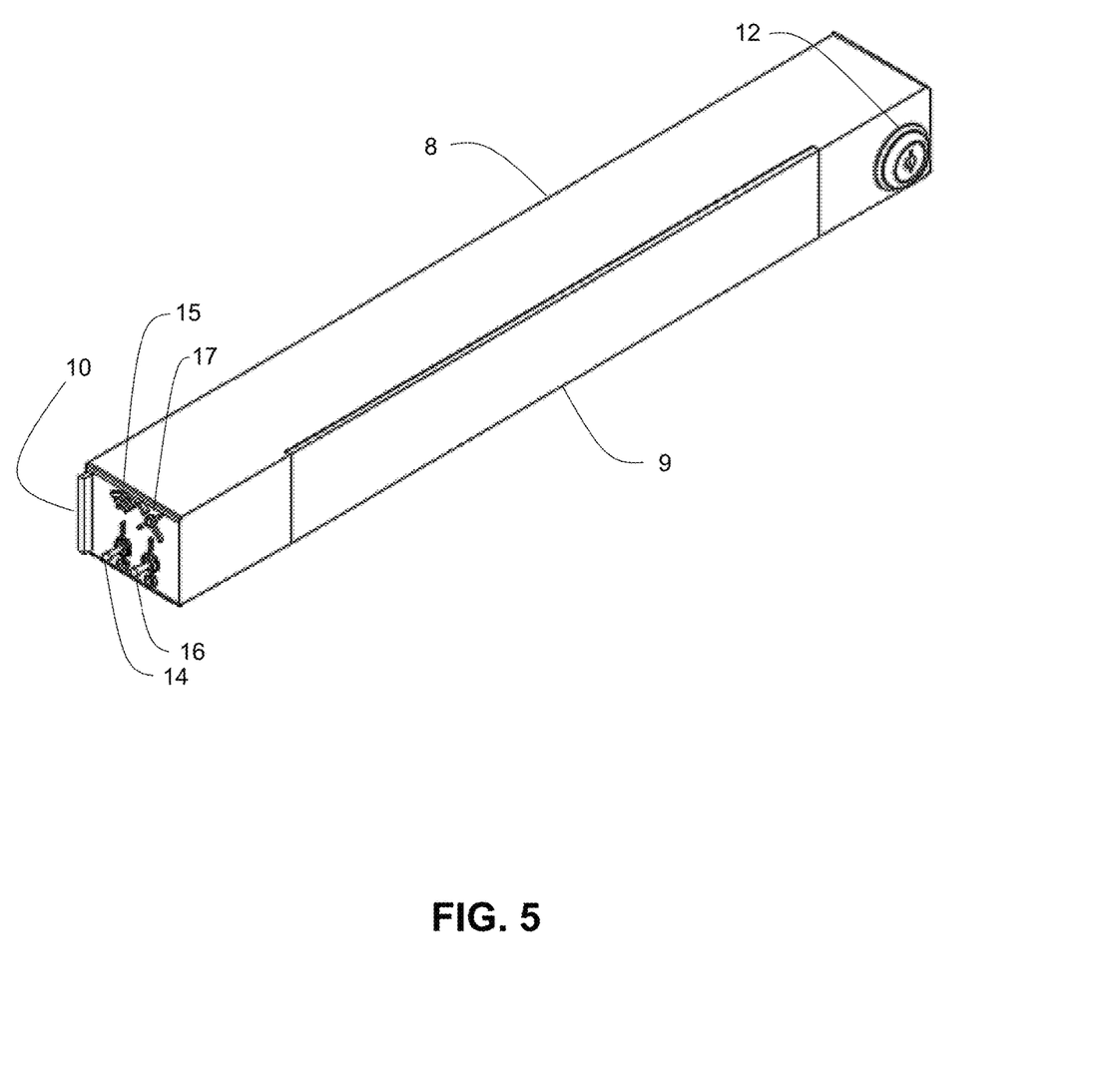
FIG. 5: Trailer Wireless Reverse Light Bar (left top view)
Figure 6:
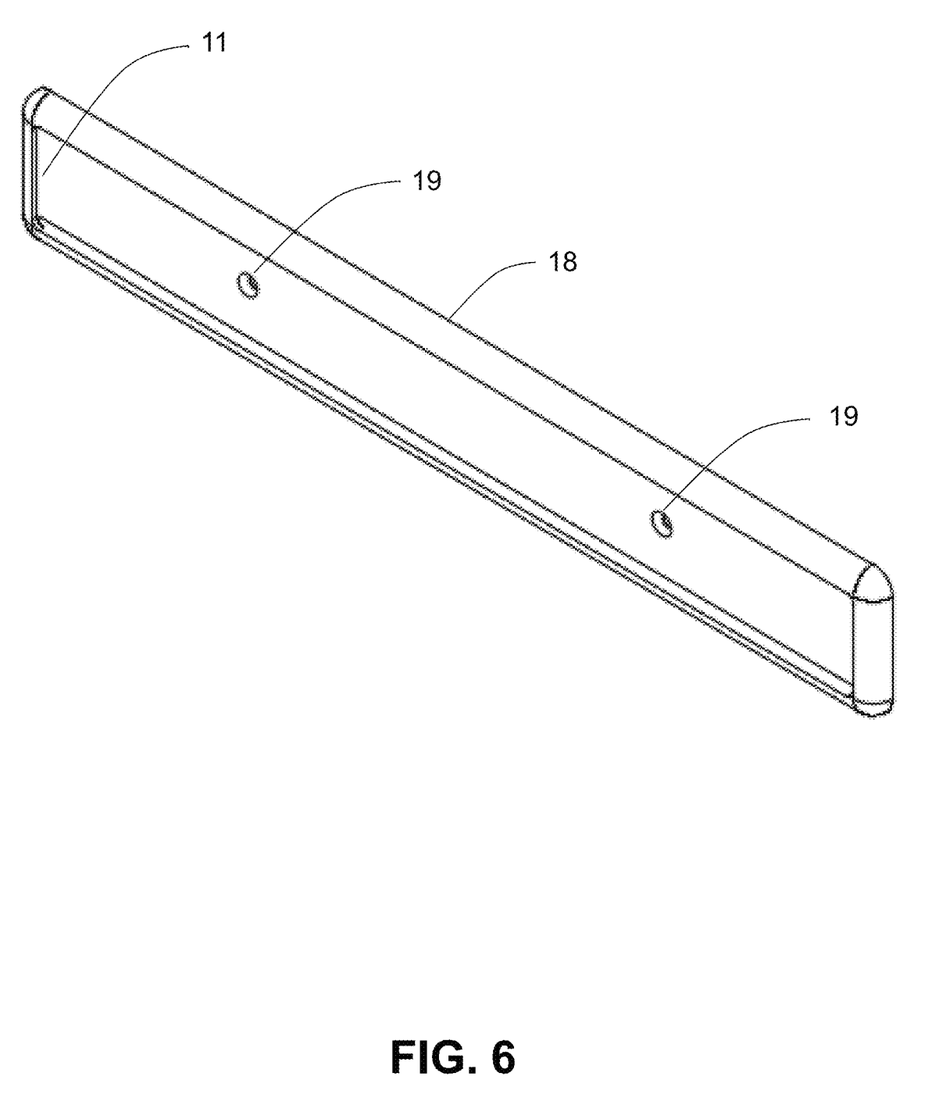
FIG. 6: Trailer Wireless Reverse Light Mounting Base (right top view)
Figure 7:
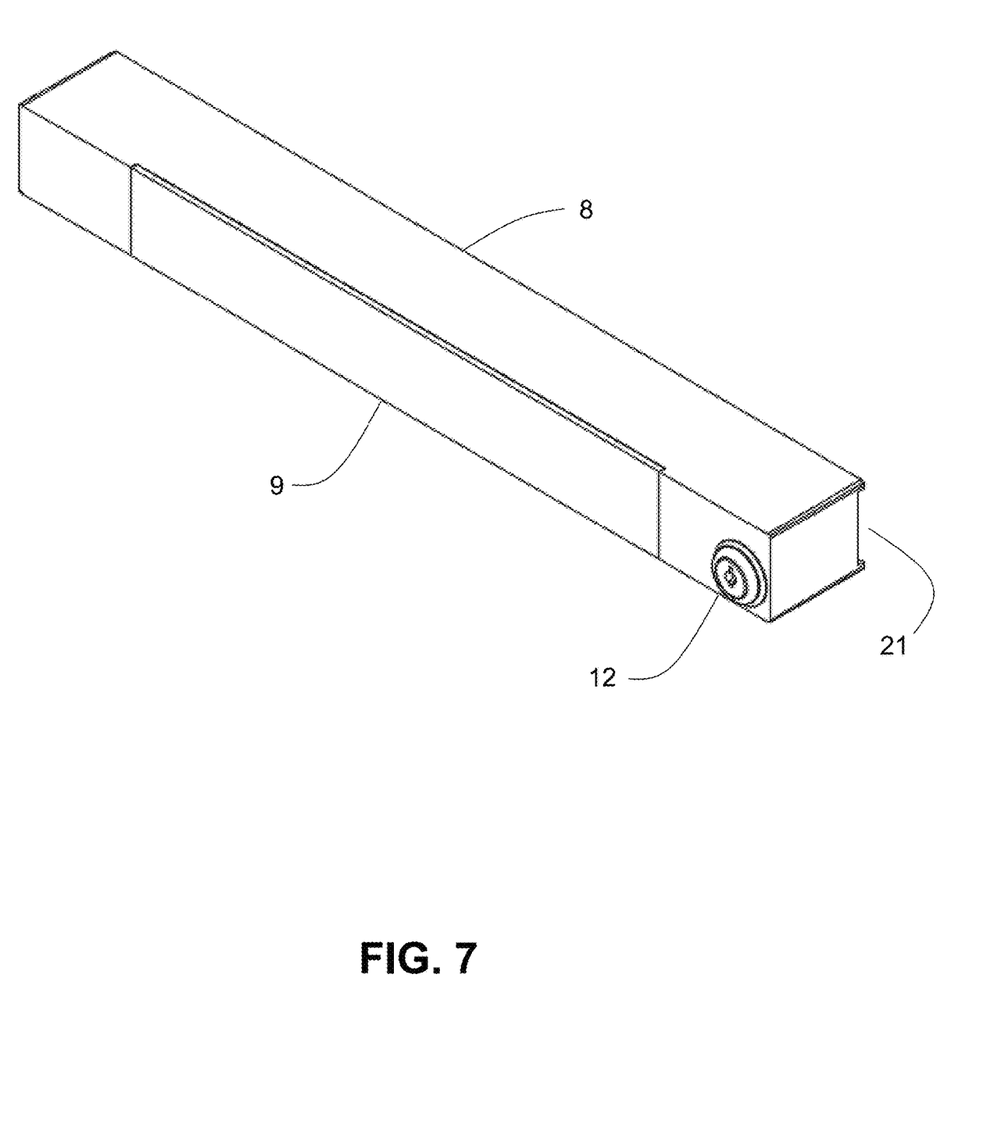
FIG. 7: Trailer Wireless Reverse Light Bar Unlocked (right top view)
Figure 8:
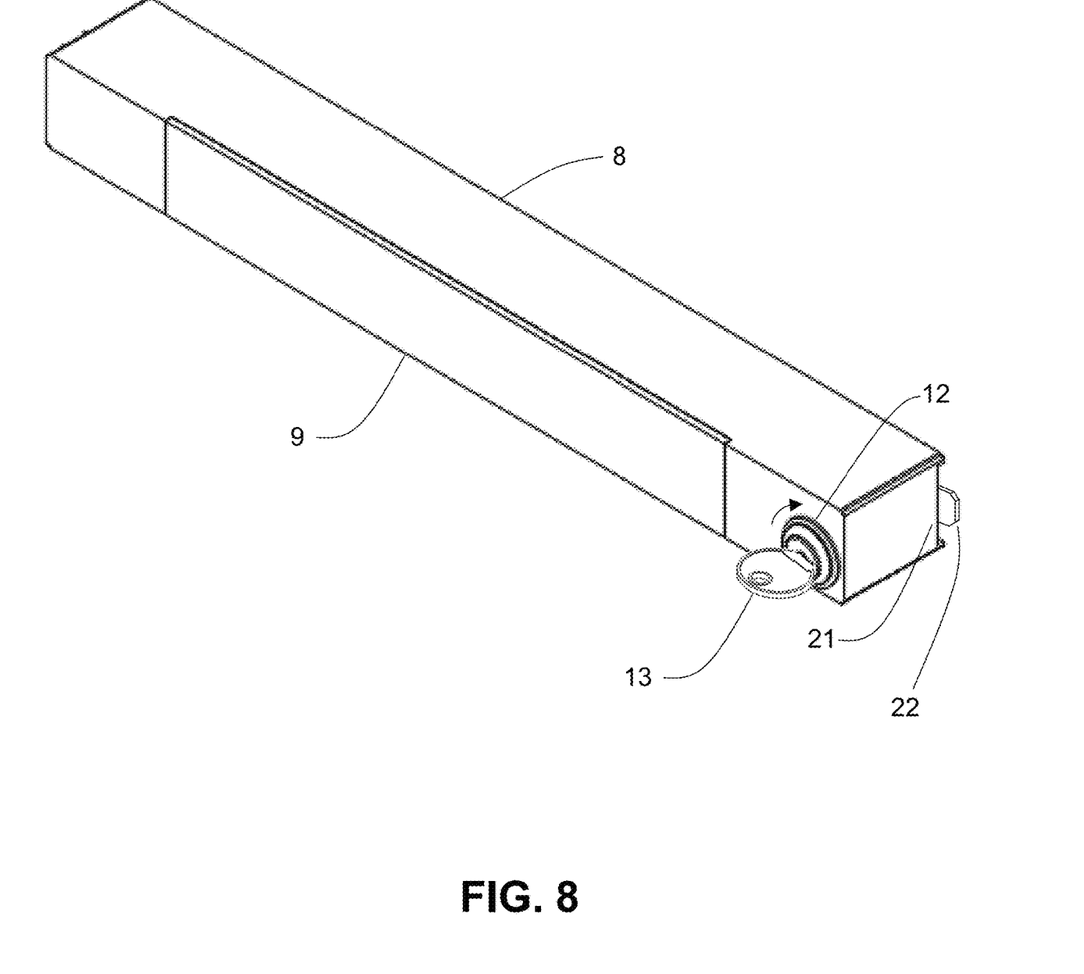
FIG. 8: Trailer Wireless Reverse Light Bar Locked (right top view)
Figure 9:
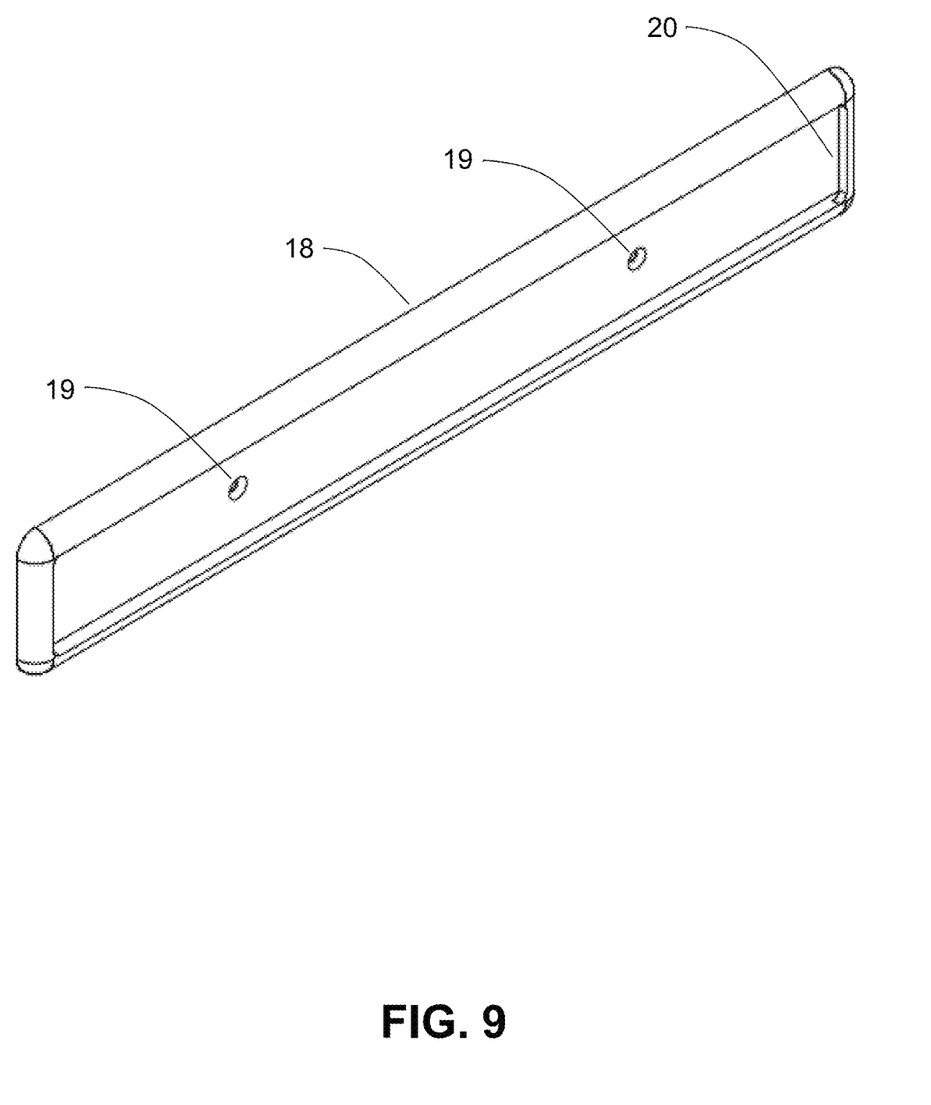
FIG. 9: Trailer Wireless Reverse Light Mounting Base (left top view)

FIGS. 5-14 show various views of the trailer wireless reverse light visible components. Not shown are the internal components that will be discussed with FIG. 15. FIG. 5 is the left top view of the trailer wireless reverse light bar 8. The design uses LED lights 9. They are very bright and consume low current and therefore very applicable to a battery-powered lighting device. Novel are the tab 10, lock 12 and shown later in FIG. 8 are the corresponding key 13 and lock tongue 22. They allow the trailer wireless reverse light bar 8 to be secured to a permanently installed mounting base 18 (FIG. 6) when used as a wireless reverse light and removeable for use as auxiliary lighting or recharging. The trailer wireless reverse light bar 8 has two switches. One is the wireless switch 14 that turns the wireless receiver on/off (for long-term storage or to prevent unwanted activation when not used). The other is the manual light switch 16 that turns the light on/off when used in the auxiliary mode. Both switches have embossed international symbol labels for wireless 15 and light 17. The trailer wireless reverse light bar 8 is weatherproofed by sealing the internal electrical components yet allowing the lock 12 to be open to the environment.

FIG. 6 is a right top view of the trailer wireless reverse light mounting base 18. The mounting base 18 is attached to the trailer using the mounting screw holes 19. In addition, the mounting base 18 could also be attached with adhesive backing. The tab receiver slot 11 accepts the insertion of tab 10 as shown in FIG. 5.

FIG. 7 is a right top view of the trailer wireless reverse light bar 8. As noted earlier in FIG. 5, the design uses LED lights 9. This view shows the lock 12 in the unlocked position. The lock tongue exit slot 21 is visible.

FIG. 8 is similar to FIG. 7 with a right top view of the trailer wireless reverse light bar 8 with the LED lights 9, but with the key 13 inserted into the lock 12 and rotated 90 degrees. This rotation extends the lock tongue 22 through the lock tongue exit slot 21. It is this lock tongue 22 that engages the lock tongue receiver slot 20 shown in FIG. 9 when the trailer wireless reverse light bar 8 is inserted into the base 18 that is attached to the trailer 2 using the mounting screw holes 19.

Figure 10:
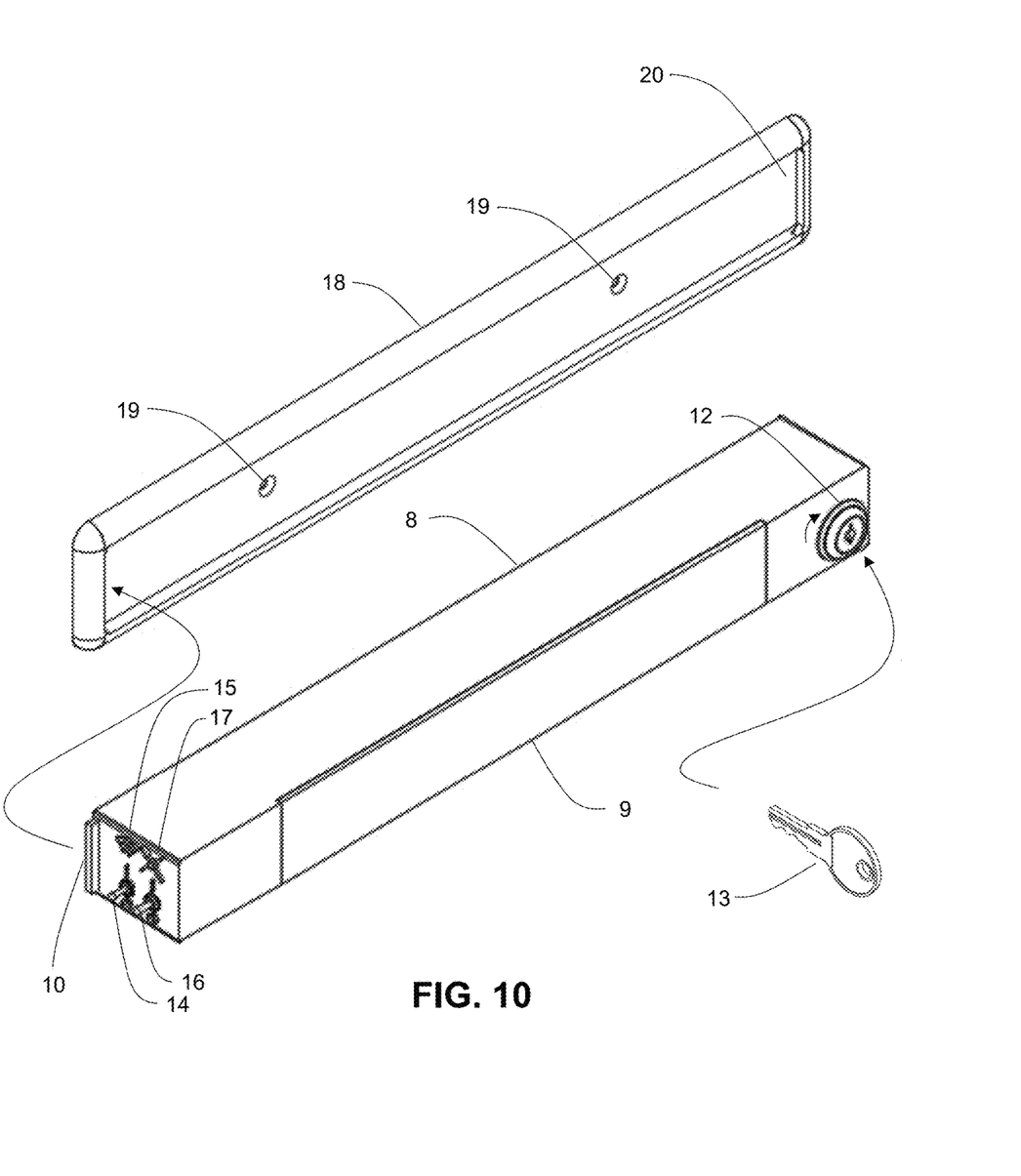
FIG. 10: Trailer Wireless Reverse Light Insertion and Locking (left top view)

FIG. 10 is a top left view of both the mounting base 18 and the trailer wireless reverse light bar 8. It shows the tab 10 being inserted into the tab receiver 11 (not shown). The key 13 is being inserted into the lock 12. The other mounting base 18 elements shown are the lock tongue receiver slot 20 and the mounting screw holes 19. The LED lights 9, wireless switch 14, manual light switch 16 and the embossed wireless symbol 15 and light symbol 17 are also visible on the trailer wireless reverse light bar 8.

Figure 11:
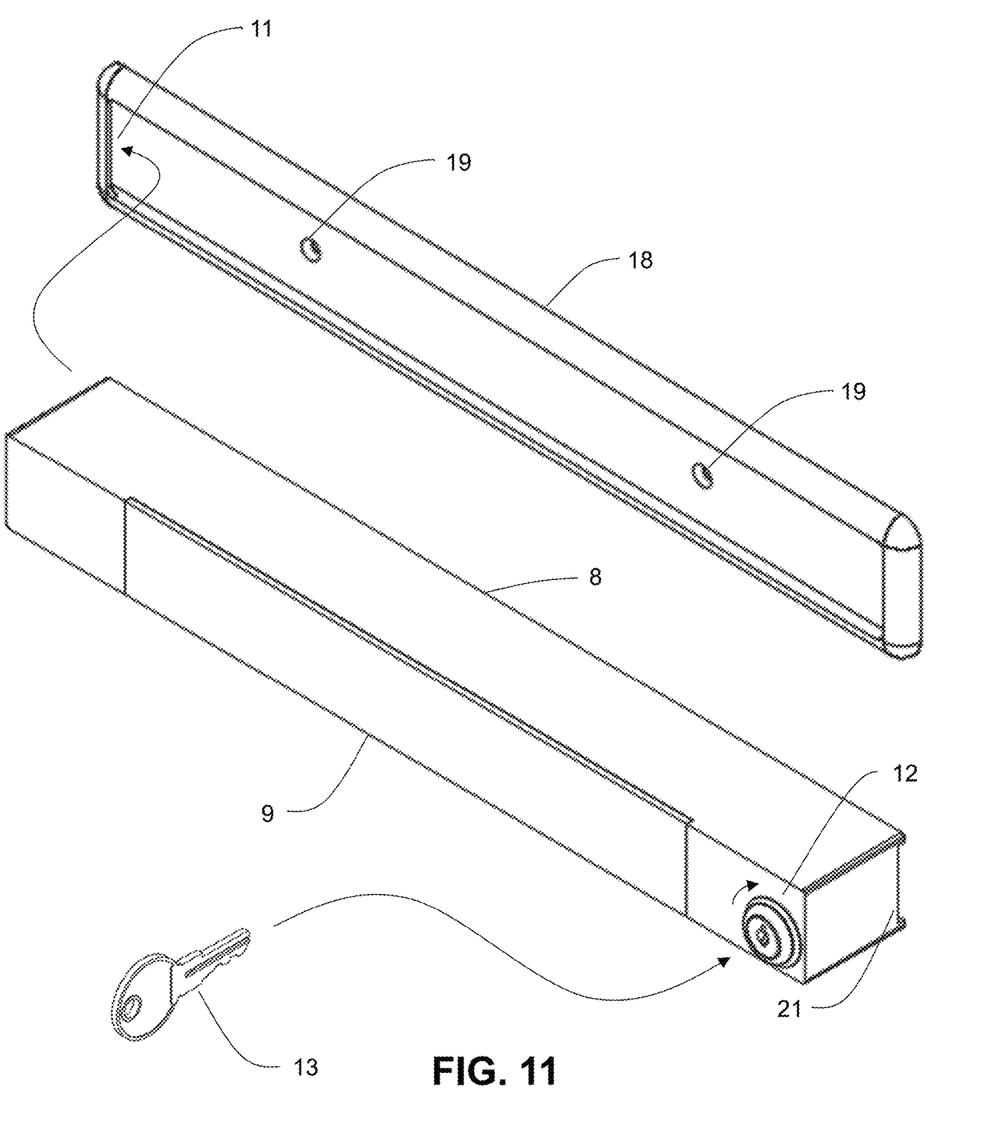
FIG. 11: Trailer Wireless Reverse Light Insertion and Locking (right top view)

FIG. 11 is a top right view of both the mounting base 18 and the trailer wireless reverse light bar 8 showing the same assembly step as FIG. 10, but now with the lock tongue exit slot 21 visible. The key 13 is ready to be inserted in the lock 12. The other mounting base 18 elements shown are the tab receiver slot 11 and the mounting screw holes 19. The LED lights 9 are also visible on the trailer wireless reverse light bar 8.

Figure 12:
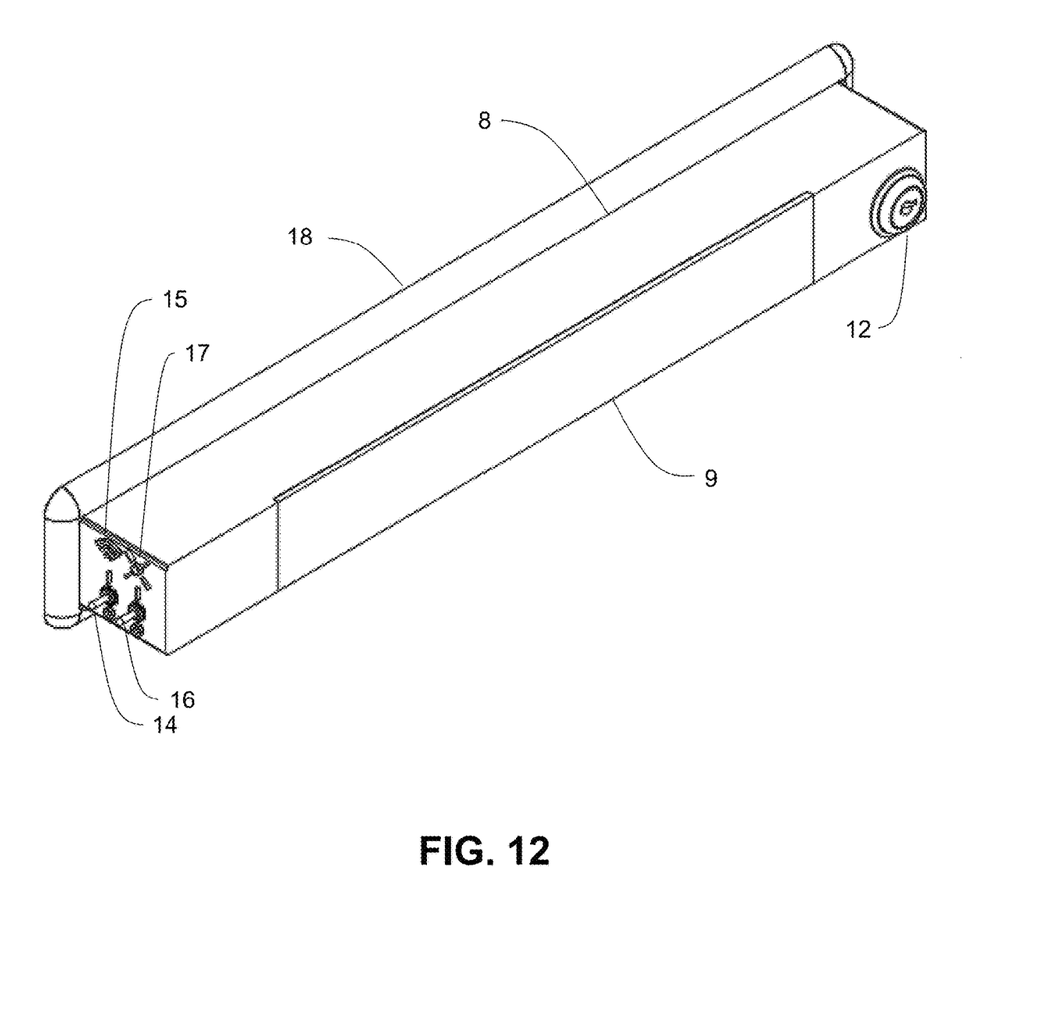
FIG. 12: Trailer Wireless Reverse Light Fully Mounted and Locked (left top view)

FIG. 12 is the top left view of the trailer wireless reverse light bar 8 fully inserted and locked into the mounting base 18. Note that the trailer wireless reverse light bar 8 is now secured in place and cannot be removed. The other visible elements are the LED lights 9, lock 12 (in locked position), wireless switch 14, manual light switch 16 and the embossed wireless symbol 15 and light symbol 17.

Figure 13:
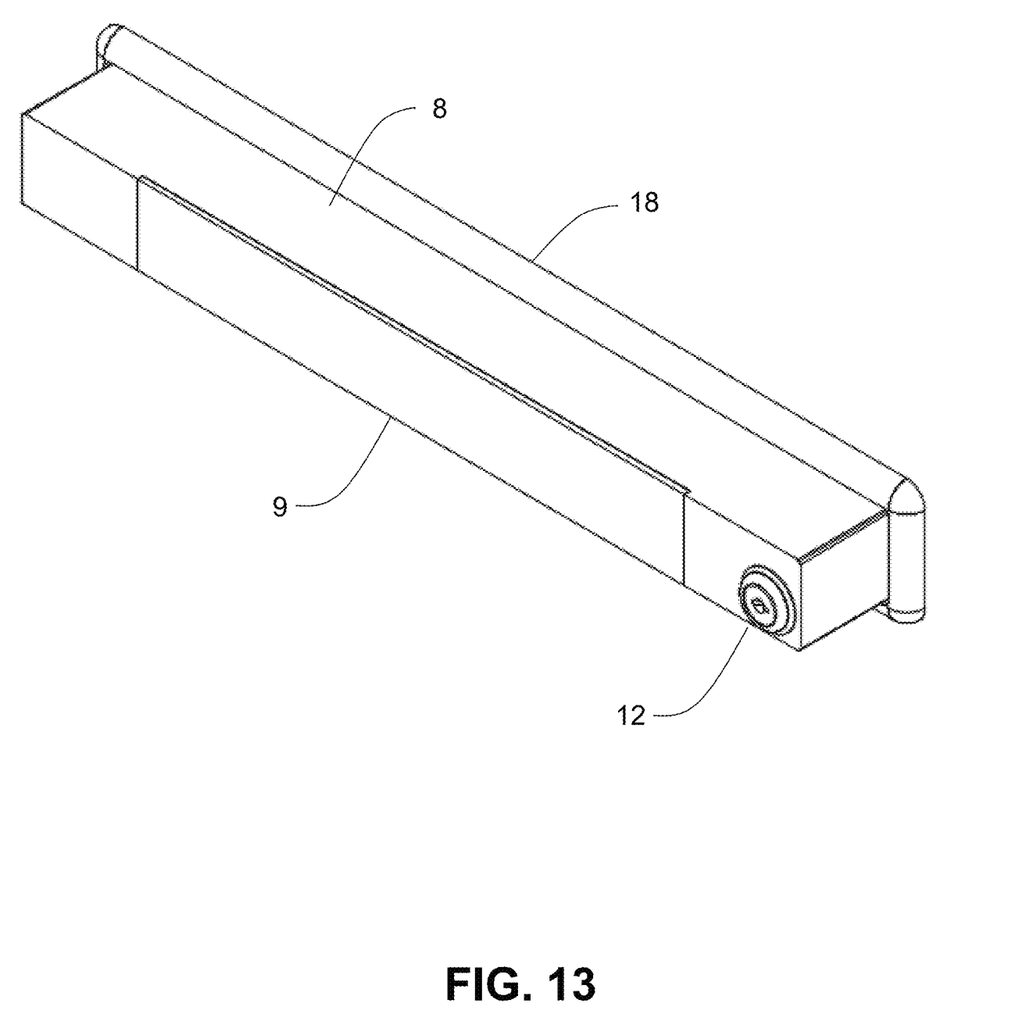
FIG. 13: Trailer Wireless Reverse Light Fully Mounted and Locked (right top view)

FIG. 13 is similar to FIG. 12 except it is a top right view.

Figure 14:
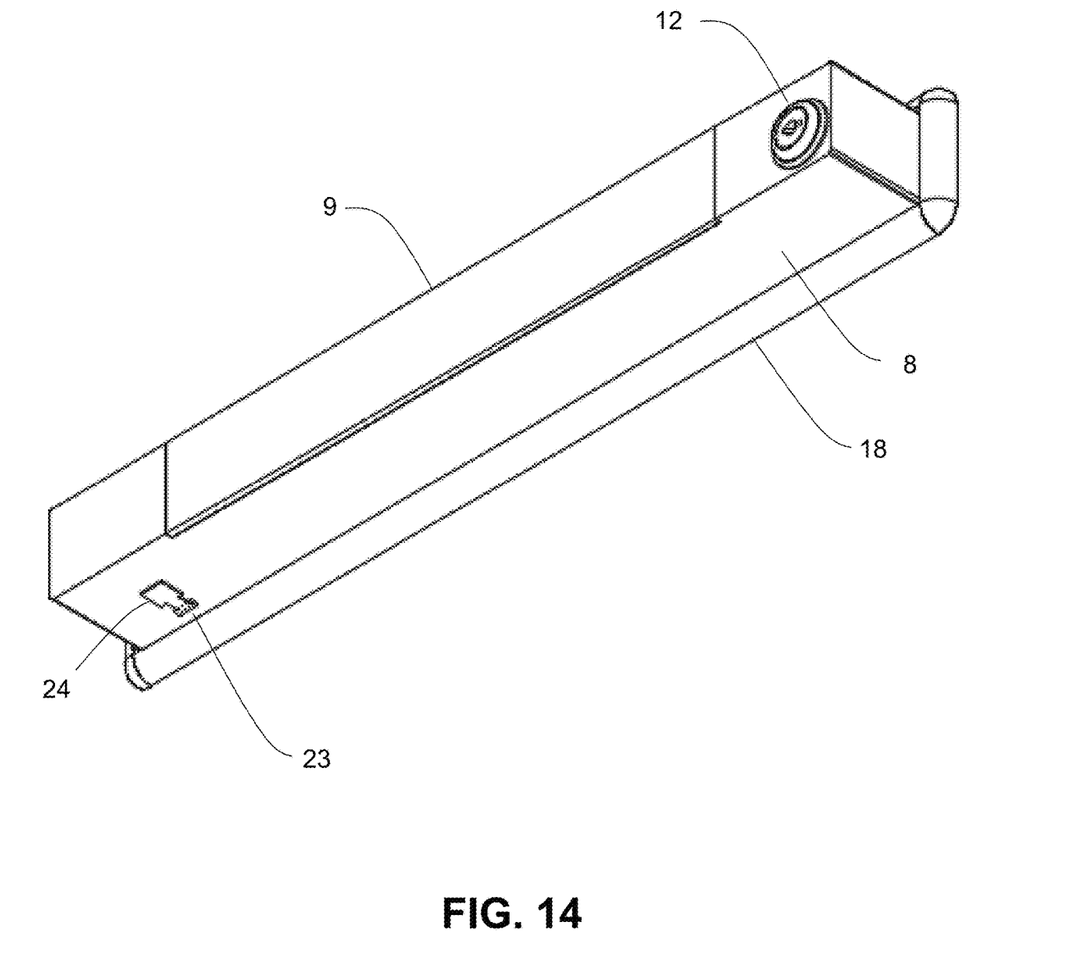
FIG. 14: Trailer Wireless Reverse Light Fully Mounted and Locked (right bottom view)

FIG. 14 is similar to FIG. 13 except it is a bottom right view. The USB charging port 23 is visible under the USB rubber seal flap 24 to weatherproof the USB charging port 23.

Figure 15:
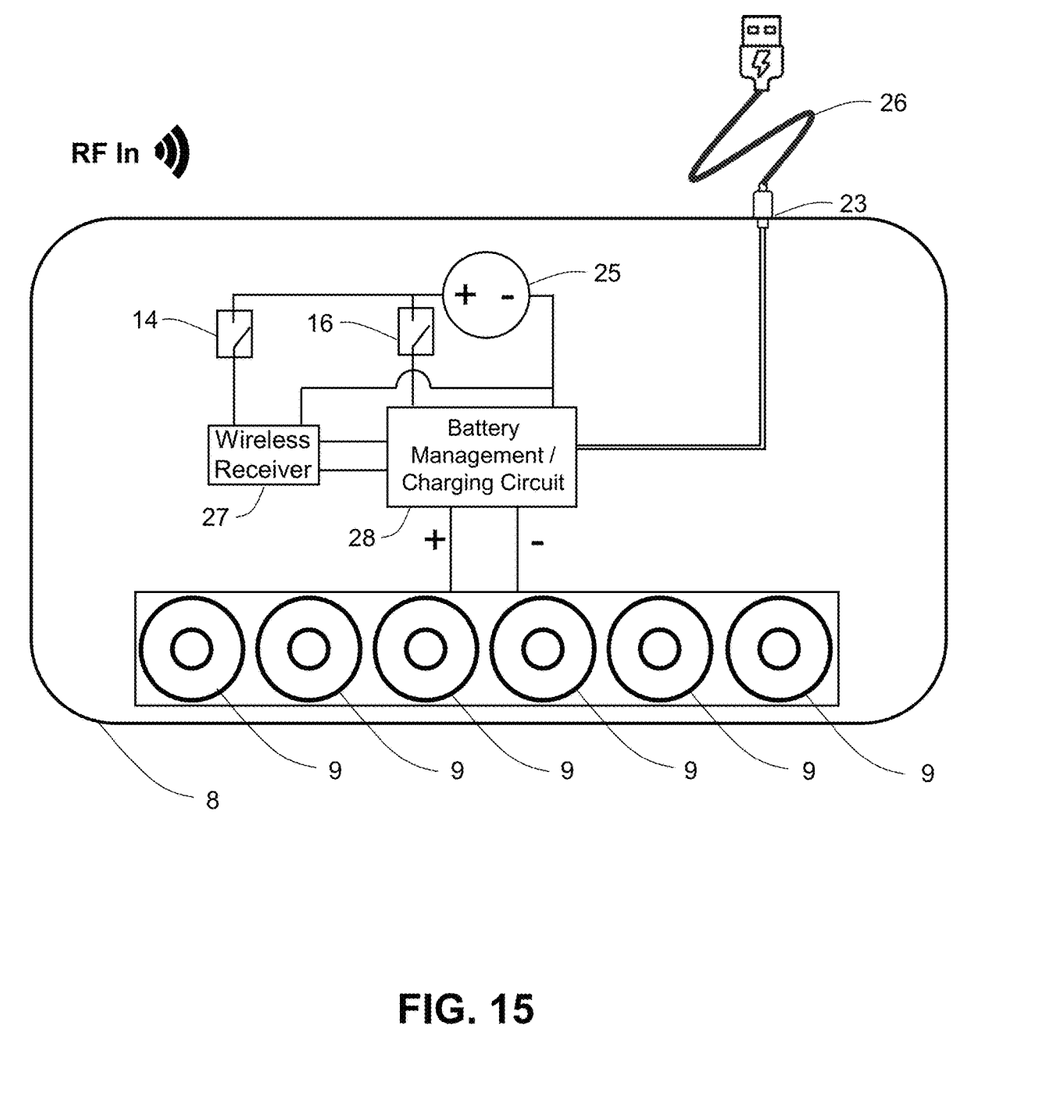
FIG. 15: Trailer Wireless Reverse Light Bar-High-Level Circuit Diagram

FIG. 15 shows the trailer wireless reverse light bar 8 high-level circuit diagram. This circuit diagram represents how the major electrical components are connected. These components are packaged in the weatherproof section of the trailer wireless reverse light bar 8. When mounted and ready to use, wireless switch 14 is turned on. Upon receiving a wireless signal a contact in the wireless receiver 27 is closed signally to the battery management/charging circuit 28 thereby turning on the LED lights 9 using power from the lithium ion battery 25. When the wireless signal is turned off the contact is opened, shutting off the LED lights 9. The LED lights 9 can also be turned on with the manual light switch 16. This is also how the trailer reverse light bar 8 is used as auxiliary lighting. When the lithium ion battery 25 requires recharging, the trailer wireless reverse light bar 8 is removed and recharged with the USB cable 26 inserted into the USB charging port 23. There are many existing wireless receiver 27 circuits and lithium ion battery management/charging 28 circuits that have been designed and are available in the market place. What is novel is how the elements are integrated into this design.

PRIOR ART

Wireless vehicle/trailer light devices (references cited below) have been disclosed in prior art. Some of these devices include trailer reverse or backup lights. Following is a summary of each relevant prior art from the oldest to the newest. Where appropriate a comparison is made to the present invention noting the unique novel art aspects.

Patent US20130241722A1, Kit for Controlling a Commercial Trucks Lights Wirelessly, is a digital wireless kit used to control the lights of a commercial truck. This is a retrofit kit to circumvent the existing truck wiring when deterioration is found and repair is required. No detail is provided how the wireless device is interconnected to the existing truck light controls and lights. Also, there is no trailer involved.

Patent US20140145837A1, Method and Apparatus for Providing Reverse Lights to a Trailer, uses a wireless transmitter to activate a reverse light. The wireless signal is created with a radio device connected to the tow vehicle backup light bulb socket or wiring directly. This is not an easy task for the novice whereas the present invention is plug and play using a reverse light wireless signal that is transmitted by using a short 7-pin extension with an integrated wireless transmitter. This prior art does utilize a light bar mounted to the rear of the trailer similarly proposed with the present invention. However, it is not removeable. It does not include the security lock and key for easy installation or removal for charging or a manual switch for use as an auxiliary light. This patent includes battery power; however, the battery needs to be removed. The patent does not indicate that the battery is rechargeable as is the case with the present invention.

Patent US20190315170A1, Wireless Trailer Signal System, comprises a wireless transmitter connected to the tow vehicle and a wireless receiver connected to the trailer. The transmitter is connected to the tow vehicle existing wiring. It is not explicitly noted, but it is believed to be connected to the 4 or 7-pin connector. The receiver is mounted on the trailer and is connected to the trailer electrical system, which in turn is connected to the trailer lights. This device seems to just replace the existing tow vehicle to trailer wire connection. It is simpler and lower cost to just use the existing trailer plug and tow vehicle receptable. The trailer lights would be powered by a separate rechargeable battery. This would not be necessary by using the existing hard-wire connection. The value of this type of system is not clear as the tow vehicle and trailer are in close proximity and therefore can have a direct connection eliminating the need for a separate trailer battery as the trailer uses the tow vehicle power for the lights.

Patent WO2020048574A1, Wireless Trailer Indication System, comprises a wireless transmitter connected to the tow vehicle trailer 7-pin connection. The trailer rear light signals (brake, turn, and night time running) are driven by a wireless receiver. The wireless light signals are transmitted to two lights on a board magnetically mounted to the rear of the trailer or towed vehicle. Neither the existing trailer nor towed vehicle wiring or lights are used. The lights have separate rechargeable batteries. Two radio frequencies are used for redundancy and therefore safety. This disclosure does not include reverse/backup lights. As noted earlier, the present invention is plug and play using a reverse light wireless signal only that is transmitted by using a short 7-pin extension with an integrated wireless transmitter. Also, the present invention is securely mounted using the integrated lock albeit removable for charging or for use as an auxiliary light.

Patent CN218536515, Wireless Trailer Tail Lamp, is similar to the previous prior art disclosure. All of the trailer rear light signals (brake, turn, night time running and including reverse) are generated by a wireless 7-pin tow vehicle plug. The wireless light signals are transmitted to two lights magnetically mounted to the rear of the trailer or other towed vehicle. The present invention is novel by using the existing trailer running, brake and turn signal lights and wirelessly driving the securely mounted reverse light.

Patent U.S. Pat. No. 11,964,609, Lighting System for Truck and Trailer Mounted Vehicles, is designed for flat-bed trucks that carry a rear mounted fork lift that can obscure visibility of the truck rear lights. This device uses wireless transmitted signals generated by the truck lighting harness or lighting socket. This art is similar to the above two patents. These signals are received by the fork lift magnetically mounted lights and use the existing fork lift battery for power. The present invention uses the reverse light signal that is transmitted by using a 7-pin extension with an integrated wireless transmitter. The other existing trailer lights (running, brake, and turn) continue to be used as originally designed driven by the other wires in the 7-pin cable connecting the tow vehicle to the trailer. Also, the present invention uses a two-piece design for mounting the reverse light. The base is permanently mounted to the trailer rear. The reverse/backup light is securely mounted to the base with a lock, but can be removed for use as auxiliary lighting.

Wireless rechargeable tow lights are available in the market place represented by patents WO2020048574A1 and CN218536515.

In summary, the disclosure of this present invention is deemed to be novel art as the wireless signal is for reverse only and is generated by using a short 7-pin extension with an integrated wireless transmitter connected between the tow vehicle 7-pin receptacle to the existing trailer 7-pin plug therefore using the existing trailer electrical system. The idea of having a wireless battery powered rechargeable LED reverse light is not novel. However, what is novel is the mounting of the reverse light bar to a fixed base with a lock and key and the use of the reverse light bar as a removeable auxiliary light with a manual switch.

References Cited

| Publication Number | Date | Inventor |
| --- | --- | --- |
| US11964609 | April 2024 | Adam & Chris Stillwell |
| CN218536515 | February 2023 | |
| WO2020048574A1 | March 2020 | Kurt Nielson |
| US20190315170A1 | October 2019 | Clinton Williams |
| US20140145837A1 | May 2014 | Michael Douglas/ Gretchen Douglas |
| US20130241722A1 | September 2013 | Yoel Martinez |

What is claimed is:
1. A trailer wireless reverse light kit comprising:
   a 7-pin extension to interconnect a tow vehicle 7-pin receptacle with a trailer 7-pin plug wherein said 7-pin extension includes 7 pass-through wires;
   a 7-pin plug on one end of said 7-pin extension inserted into said tow vehicle 7-pin receptacle;
   a 7-pin receptacle on the other end of said 7-pin extension to receive said trailer 7-pin plug;
   a wireless transmitter configured to be connected to a reverse wire and a ground wire of said 7-pin extension;
   a mounting base permanently affixed to the rear of said trailer and configured to accept and removably secure a trailer wireless reverse light bar;
   a tab receiver slot on one end and a lock tongue receiver slot on the other end of said mounting base;
   a tab on one end of said trailer wireless reverse light bar for insertion into said tab receiver slot of said mounting base;
   a lock and key with a 90 degree rotatable lock tongue on the other end of said trailer wireless reverse light bar for engaging into said lock tongue receiver slot of said mounting base;
   a wireless receiver matched to said wireless transmitter integrated into said trailer wireless reverse light bar.

\* \* \* \* \*